United States Patent [19]

French

[11] E Re. 31,032

[45] Reissued Sep. 21, 1982

[54] SOLAR WATER HEATER

[75] Inventor: Roger F. French, Jackson, N.H.

[73] Assignee: Suntime, Inc., Bridgton, Me.

[21] Appl. No.: 260,318

[22] Filed: May 4, 1981

Related U.S. Patent Documents

Reissue of:

[64] Patent No.: 4,240,405
Issued: Dec. 23, 1980
Appl. No.: 34,475
Filed: Apr. 30, 1979

[51] Int. Cl.[3] ..... F24J 3/02

[52] U.S. Cl. ..... 126/433; 126/434; 165/104.21

[58] Field of Search ..... 126/433, 434, 450, 435, 126/437, 446, 447; 165/104.21, 104.22, 104.27, 104.32

[56] References Cited

U.S. PATENT DOCUMENTS

| | | | |
|---|---|---|---|
| 2,695,753 | 11/1954 | Kirk, Jr. | 138/30 |
| 3,035,614 | 5/1962 | Kirk, Jr. | 138/30 |
| 3,390,672 | 7/1968 | Snelling | 126/433 |
| 3,952,519 | 4/1976 | Watson | 126/438 |
| 3,974,822 | 8/1976 | Patil | 126/450 |
| 4,052,976 | 10/1977 | Hinterberger | 126/433 |
| 4,061,131 | 12/1977 | Bohanon | 126/433 |
| 4,080,957 | 3/1978 | Bennett | 126/433 |
| 4,108,159 | 8/1978 | Wendel | 126/448 |
| 4,110,986 | 9/1978 | Tacchi | 126/434 |
| 4,120,172 | 10/1978 | Pierce | 165/105 |
| 4,120,289 | 10/1978 | Bottum | 126/433 |
| 4,134,390 | 1/1979 | Rawal | 126/444 |
| 4,211,207 | 7/1980 | Molivadas | 126/433 |

OTHER PUBLICATIONS

"Solar Energy Technology & Applications", by J. Richard William, Copyright 1974, Annarbor Science Publishers, pp. 39–44.

"Solar Energy Thermal Process", Duffie & Bechman, Copyright 1974, John Wiley & Sons, pp. 231–235, 252, 254, 255, 264–267.

"Report of the N. England Solar Energy Assoc.", 1st Annular Conference, 1976, WESEA, pp. 411, 412, 479–485.

"Direct Use of the Sun's Energy", by F. Daniels, 1964, Yale Univ., pp. 115–116.

*Primary Examiner*—Daniel J. O'Connor
*Attorney, Agent, or Firm*—W. R. Hulbert

[57] ABSTRACT

Solar water heater using the phase-change principle including a collector, a condenser, and [an accumulator] *a vapor release drum* joined to form a natural circulation system [, including a pressure accumulator and a vapor release drum].

6 Claims, 2 Drawing Figures

SOLAR WATER HEATER

Matter enclosed in heavy brackets [ ] appears in the original patent but forms no part of this reissue specification; matter printed in italics indicates the additions made by reissue.

BACKGROUND OF THE INVENTION

It has been suggested that heat-transfer from a solar collector to water can be accomplished by use of a phase-change system in which the operative liquid is boiled in the collector and condensed in heat-exchange with the water to release the heat of vaporization. The pressure in the system [would be maintained] *may be limited* at a suitable [high] level by the use of an accumulator. It has been found in practice, however, that although the principle is satisfactory, certain practical considerations prevents such a system for operating in the optimum manner. For instance, it has been found that there is a tendency for the vapor to be converted to liquid in the tubes connecting the collector to the condenser, thus causing slugs of the liquid to pass into the condenser. Since it is the return of the heat of vaporization in the condenser that serves to heat the water in the optimum manner, the presence of any amount of liquid in the condenser tubes causes a less-than-effective operation. Also, the presence of large bubbles in the liquid sets up an oscillatory condition that can cause flow of liquid into the condenser, as well as causing a vibration of the mechanical elements that can lead to their destruction or to the failure of joints. The phase-change solar heater lends itself to installation in remote locations, because it is a self-regulating system that needs no electricity or supplemental fuel. However, the installation in such areas is difficult because of the necessity for assembling it in the field and providing suitable start-up pressure for the accumulator. These and other difficulties experienced with the prior art devices have been obviated in a novel manner by the present invention.

It is, therefore, an outstanding object of the invention to provide a solar water heater in which very little liquid finds its way into the condenser.

Another object of this invention is the provision of a solar water heater which is free of large liquid level oscillations.

A further object of the present invention is the provision of a solar water heater in which the danger of failure of the elements due to fluid oscillation and mechanical vibration is substantially reduced.

It is another object of the instant invention to provide a solar water heater which can be installed in the field and in remote locations less need for skilled workmanship or electrical power at such a location.

A still further object of the invention is the provision of a solar water heater which is simple in construction, inexpensive to manufacture, and which is capable of a long life of useful service with a minimum of maintenance.

With these and other objects in view, as will be apparent to those skilled in the art, the invention resides in the combination of parts set forth in the specification and covered by the claims appended hereto.

SUMMARY OF THE INVENTION

In general, the invention consists of a solar water heater, making use of phase-change heat transfer and having a condenser with an inlet and an outlet, which condenser is in contact with the water to be heated. The solar collector is provided having a bottom inlet and a top outlet and having an inner conduit that connects the inlet and the outlet. The conduit is suitable for exposing a heat-transfer medium in the conduit to solar energy and the collector outlet is located below the condenser. Conduits are provided to join the outlet of the condenser [and the outlet of the condenser] to the inlet of the collector *and the outlet of the collector* to the inlet of the [collector] *condenser*, thus forming a closed circuit containing the phase-change liquid heat-transfer medium. An accumulator having means for regulating the pressure [is] *may be* connected to the circuit below the condenser. A vapor-release drum is connected in the circuit between the outlet of the solar collector and the inlet of the condenser.

More specifically, the vapor-release drum has sufficient volume to assure that the upper surface of the heat-transfer medium always remains within the confines of the drum during normal operation of the heater. The drum is of generally elongated cylindrical conformation and extends parallel to and spaced upwardly from a horizontal upper edge of the solar collector. This further serves as a manifold connecting the several collectors.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
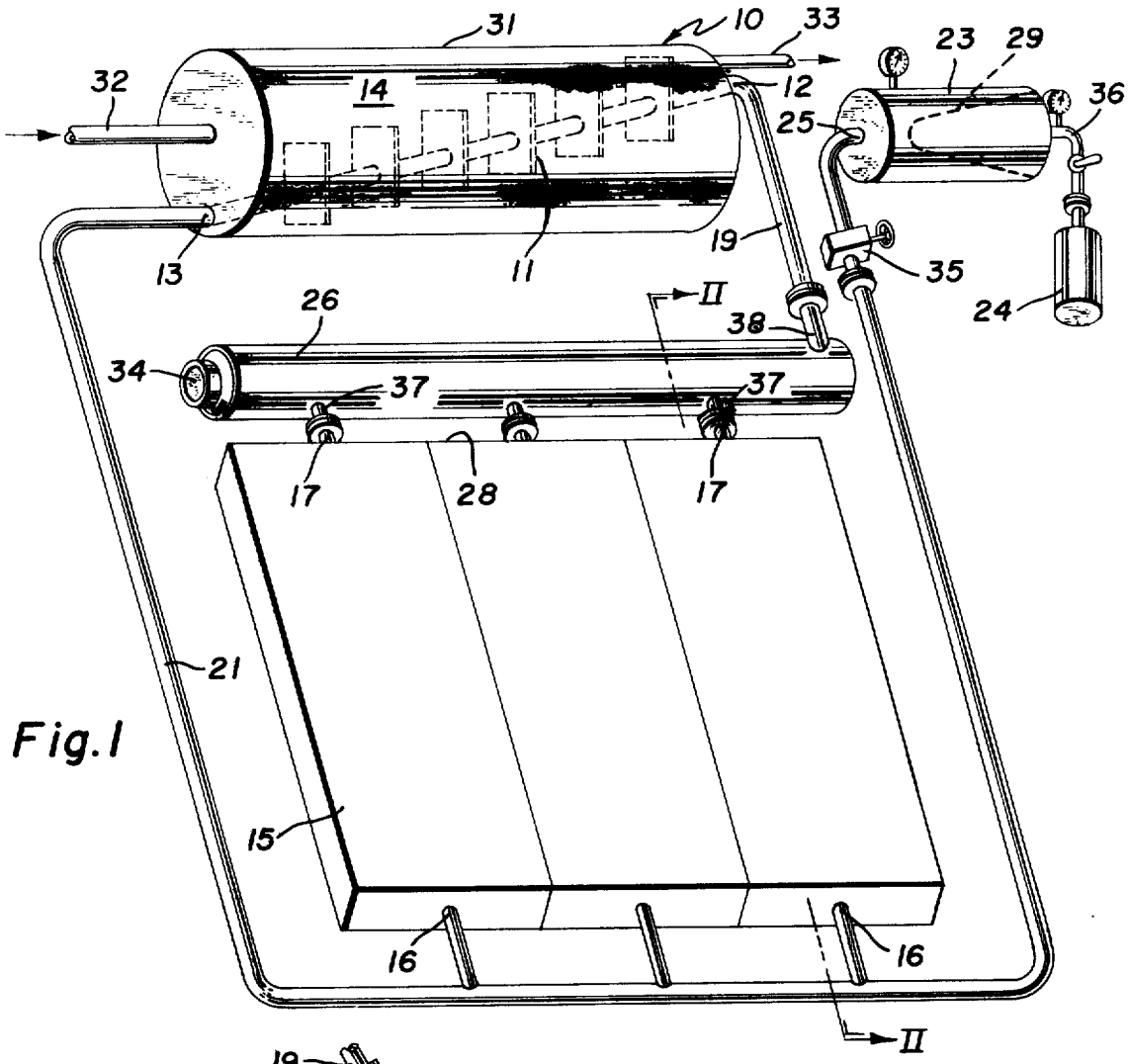
FIG. 1 is a somewhat schematic view of a solar water heater embodying the principles of the present invention.

Referring first to FIG. 1, wherein are best shown the general features of the invention, the solar water heater, indicated generally by the reference numeral 10, is shown as using the phase-change principle of heat transfer. A condenser 11 is provided with an inlet 12 and outlet 13 and is in heat conductive contact with a body of water 14 to be heated. The solar collector 15 is provided having a bottom inlet 16 and an upper outlet 17. The collector has an inner conduit 18 that connects this inlet and outlet, the inner conduit being suitable for exposing a heat-transfer medium in the conduit to solar energy. The outlet 17 of the collector is below the condenser 11.

A conduit 19 joins the outlet 17 of the collector to the inlet 12 of the condenser and a conduit 21 connects the outlet 13 of the condenser to the inlet 16 of the collector. The condenser 11, the conduit 21, the collector 15, and the conduit 19 form a closed circuit and the phase-change liquid heat transfer medium 22 is located within the closed circuit. An accumulator 23 is provided, having a means 24 for regulating the pressure within it and having an inlet 25 that is connected to the circuit below the condenser 11; specifically, it is connected adjacent the inlet 16 of the collector 15. A vapor-release drum 26 is connected in the circuit between the outlet 17 of the solar collector 15 and the inlet 12 of the condenser 11.

Figure 2:
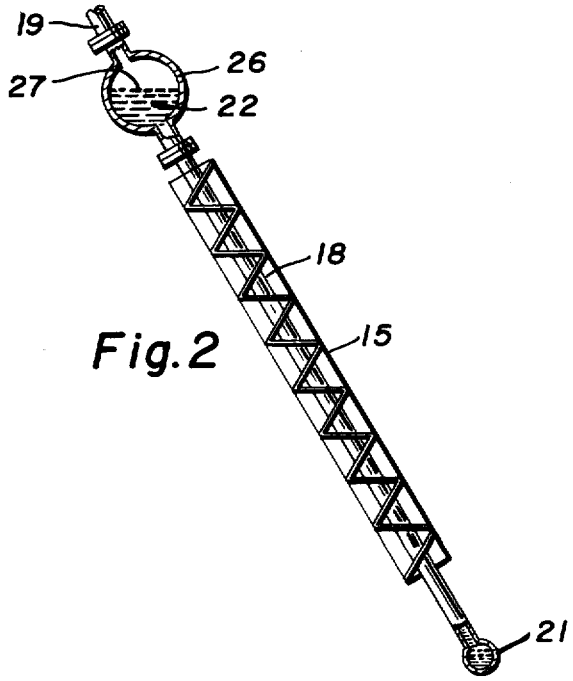
FIG. 2 is a vertical sectional view of the heater taken on the line II—II of FIG. 1.

Referring particularly to FIG. 2, it can be seen that the vapor-release drum 26 has sufficient volume to assure that the upper surface 27 of the heat-transfer medium 22 always remains within the confines of the drum during normal operation of the heater. The solar collector 15 has a generally rectangular configuration with an upper horizontal edge 28 on which the collector outlet 17 is located. The vapor-release drum has an elongated cylindrical configuration that extends parallel to and is spaced upwardly from the said upper horizontal edge of the solar collector. The heat transfer medium 22 in the preferred embodiment is a fluorinated hydrocarbon, specifically, Freon 114. The drum 26 is provided with a liquid level observation window 34. The drum 26 is of elongated cylindrical confirmation and is initially supplied for incorporation into the circuit with integral nipples 37 for field connection to the conduit.

The accumulator 23 is of the bladder-type and its bladder 29 is formed of Neoprene or butyl rubber. The condenser 11 is located within an insulated water tank 31 containing the body of water 14 and the water tank has a lower water inlet 32 and an upper water outlet 33. The condenser 11 and the tank 31 are formed of stainless steel for lightness and resistance to corrosion.

The solar collector 15, the conduits 19 and 21, the drum 26, and the condenser 11 are arranged so that no vapor traps exist within them which would restrict the flow of vapor. In the preferred embodiment, the various conduits, including the conduits 19 and 21, are formed from deoxidized copper tubing and deoxidized forging copper fittings which are silver soldered with a forming-gas atmosphere and a hydrogen torch.

A shut-off valve 35 is located adjacent the accumulator inlet 25 to permit it to be disconnected from the circuit without loss of pressure or fluid. The accumulator 23 is capable of independently containing a supply of liquid under pressure before initial installation, because of the presence of this valve. The accumulator 23 consists of a container separated into two parts by the flexible bladder 29, the container being provided with a valve inlet at the one part for the introduction and retention of an inert gas under pressure with a valve inlet at the other part for the introduction and retention of the heat-exchange fluid.

The operation of the solar water heater 10 will now be readily understood in view of the above description. Its installation at the site is facilitated by the fact that the accumulator 23 can be shipped as an independent unit with the heat-exchange fluid initially under pressure, so that it is not necessary to deliver pressurizing equipment to the site. Also the drum element, as has been stated, is provided with nipples 37 and 38 which are readily attached to the other element; for instance, the nipples 37 are attached to the outlet pipes 17 of the collector 15 and the nipple 38 can be attached to the conduit 19 leading to the inlet 12 of the condenser 11. Normally, the collector 15 would be mounted in an inclined condition, as shown in FIG. 2, and directed toward the sun with an angularity determined by the direction of the path of the sun during various parts of the year. The condenser, of course, must be provided at a higher point and quite often can be located in the peak of the roof of the building within which the apparatus is to be used.

During operation, the heat-exchange medium or fluid 22 in the collector 15 is subjected to heat from the sun's rays and its temperature rises. Eventually, the temperature of vaporization at the particular pressure selected is reached and the fluid in the upper, warmer part of the body vaporizes. It leaves the surface 27 in the form of bubbles and passes into the portion of the drum 26 above the liquid level. The vapor passes through the conduit 19 into the entrance 12 of the condenser 11. Within the water tank 31 and the body of water 14, the condenser is provided with inclined heat-exchange units facilitating the transfer by conduction of heat from the heat-exchange vapor into the water. The water forms part of a flowing hot water circuit (not shown) which is external of the apparatus, but including inlet 32 and outlet 33. The conduction of heat into the body of water causes the temperature of the vapor to drop until the condensation point is reached. The liquid thus formed flows out of the condenser through the outlet 13, down to conduit 21, and to the bottom of the collector 15. At the bottom part of the collector, the liquid enters the collector through the inlets 16 and the cycle is continuously repeated. The pressure in the system is limited to a pre-set value by the accumulator 23 and by the means 24 for regulating the pressure which operates through the valve inlet 36 of the accumulator on one side of the bladder 29, the heat-exchange fluid being on the other side.

The advantages of the invention will now be readily understood in view of the above description. The drum 26 acts as a reservoir to maintain an adequate level of liquid Freon without flooding the heat-exchanger or condenser 11. It provides an increased surface to act as a velocity reducer and provides positive separation of the vapor from the liquid to prevent carry-over of the liquid into the condenser. The presence of the vapor-release drum 26 also serves as a damper to prevent the oscillatory action which would cause the level of the liquid to oscillate and cause carry-over of liquid into the heat-exchanger. It will be understood that the presence of liquid in the heat-exchanger reduces the efficiency of the phase-change heat transfer, since the most desirable situation is for all heat transfer to take place due to the large calorie value of the conversion of the vapor to the liquid phase. This calorie value is the so-called "heat of vaporization" and is much larger than the heat available by simple temperature reduction of the liquid. The presence in the circuit of the drum 26 and its observation window 34 permits the operator to observe and assure that the liquid level is within the proper level, that is to say, that the surface 27 of the liuqid body 22 remains in the same place, and so that he can make adjustments if it is not. The use of the prefabricated drum 26 makes installation much easier and reduces cost. The precharged accumulator 23 greatly reduces initial equipment required at the installations site and also reduces the degree of skilled labor that is necessary. The system shown in the drawing also provides a means for storing the Freon in the accumulator, while performing repairs or replacement of components in the system and this can be done without releasing the Freon into the atmosphere. It also provides a means for recovering the Freon, if the system is dismantled, without the use of any special recovery equipment and it avoids the release of Freon into the atmosphere which is desirable from an ecological point of view. The means 24 for regulating the pressure in the accumulator is shown as a pressurized tank of gas in the preferred embodiment an inert gas such as nitrogen, carbondioxide, or argon is used to improve the reliability for the accumulator in the system and assures that deterioration of the equipment due to the chemical attack does not take place. The present system allows for the geographic placement of the accumulator anywhere in the system, as long as it is connected to the lowest point in the system.

It can be seen that the present system allows a wood-burning system to backup the heat by using it in parallel with the heat-exchanger or tank 31, the collectors acting as a thermal diode. The present system also makes it possible to use a dual orientation for the solar collector 15, possibly by bringing about a facing of the collectors southeast to collect the maximum heat output at 9 A.M. and toward the southwest for the maximum heat output at 3 P.M. and also to better match the water use without the need for any additional controls.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Solar water heater making use of phase-change heat transfer, comprising:

(a) a condenser having an *upper* inlet and [an] *a lower* outlet, which condenser is in contact with the water to be heated, (b) a solar collector having a bottom inlet and a top outlet and [having an] *at least one* inner conduit that connects the inlet and the outlet, the conduit being suitable for exposing a heat-transfer medium [in] *within the length of* the conduit to solar energy, the collector outlet being located below the condenser, (c) [conduits joining] *a second conduit connecting* the outlet of the collector *directly* to the inlet of the condenser and *a third conduit connecting* the outlet of the condenser directly to the inlet of the collector to form a closed circuit, [(d) A] *said closed circuit adapted to be charged with a* phase-change [liquid] heat transfer medium [located within the circuit],

*(d) means for limiting the pressure in said closed circuit during normal operation of the heater, and*

[(e) an accumulator having means for regulating the pressure therein and having an inlet that is connected to the circuit below the collector, and]

[F] (*e*) a vapor-release drum connected in the circuit [between the outlet of the solar collector and the inlet of the condenser], *upstream of said condenser and downstream of said inner conduit, said inner conduit having its outlet at a point in said drum which is during normal operation of the heater below the liquid-vapor interface within said drum so as to receive heat transfer medium from said inner conduit and,* wherein the vapor-release drum has sufficient volume that the upper surface of the heat transfer medium [always] remains within the confines of the drum so that, during normal operation of the heater only the heat transfer medium which becomes vaporized is released into the inlet of the condenser *whereby all heat transfer takes place due to the conversion of the vapor to the liquid phase.*

[2. Solar water heater as recited in claim 1, wherein the solar collector has a generally rectangular configuration with an upper horizontal edge on which the collector outlet is located, and wherein the vapor-release drum has an elongated cylindrical configuration that extends parallel to and spaced upwardly from the said upper horizontal edge of the solar collector.]

[3. Solar water heater as recited in claim 2, wherein the heat transfer medium is a fluorinated hydrocarbon.]

[4. Solar water heater as recited in claim 3, wherein the heat transfer medium is Freon 114.]

5. Solar water heater as recited in claim 1, wherein [the accumulator is a bladder-type] *said means for limiting pressure in said closed circuit comprises a bladder-type accumulator having means for regulating the pressure therein and having an inlet that is connected to the circuit below the collector.*

[6. Solar water heater as recited in claim 5, wherein the bladder is formed of Neoprene.]

7. Solar water heater as recited in claim 1, wherein the condenser is located within an insulated water tank, the water tank having a lower water inlet and an upper water outlet the condenser and tank being formed of stainless steel.

[8. Solar water heater as recited in claim 1, wherein the solar collector, the conduits, the drum, and the condenser are arranged so that no vapor traps exist within them which would restrict the flow of vapor.]

[9. Solar water heater as recited in claim 1, wherein the conduits are comprised of deoxidized copper tubing and deoxidized forged copper fittings which are silver soldered.]

[10. Solar water heater as recited in claim 1, wherein the drum is provided with a liquid level observation window.]

11. Solar water heater as recited in claim [1] *5* wherein a shut-off valve is located adjacent the accumulator inlet to permit it to be disconnected from the circuit without loss of pressure or of fluid.

12. Solar water heater as recited in claim 11, wherein the accumulator is capable of independently containing a supply of fluid under pressure before initial installation.

13. Solar water heater as recited in claim [11] *5*, wherein the accumulator consists of a container separated into two parts by a flexible bladder, the container being provided with a valved inlet into one part for the introduction and retention of an inert gas under pressure and with a valved inlet into the other part for the introduction and retention of the fluid.

[14. Solar water heater as recited in claim 1, wherein the drum is of elongated cylindrical conformation and is initially charged with the heat transfer fluid before incorporation into the circuit with integral nipples for field-connection to the conduits.]

* * * * *